United States Patent
Hsu et al.

(10) Patent No.: US 10,812,690 B2
(45) Date of Patent: Oct. 20, 2020

(54) IMAGING MODULE AND ELECTRONIC DEVICE

(71) Applicant: QISDA CORPORATION, Taoyuan (TW)

(72) Inventors: Nien-Tsung Hsu, Taoyuan (TW); Hsin-Hung Lin, Taoyuan (TW); Shin-Hao Wu, Taoyuan (TW); Yung-Yeh Chang, Taoyuan (TW); Shih-Wei Shen, New Taipei (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/351,468

(22) Filed: Mar. 12, 2019

(65) Prior Publication Data
US 2020/0195814 A1 Jun. 18, 2020

(30) Foreign Application Priority Data
Dec. 13, 2018 (CN) .......................... 2018 1 1522271

(51) Int. Cl.
*H04N 5/225* (2006.01)

(52) U.S. Cl.
CPC ................................. *H04N 5/2253* (2013.01)

(58) Field of Classification Search
CPC .. H04N 5/2251; H04N 5/2252; H04N 5/2253; H04N 5/2254; H04N 5/2257; H04N 5/2259; H04N 5/225; H04N 7/142; H04N 7/144

See application file for complete search history.

(56) References Cited

U.S. PATENT DOCUMENTS

| | | | | |
|---|---|---|---|---|
| 6,141,052 A | * | 10/2000 | Fukumitsu | G06F 1/1616 348/14.08 |
| 7,593,031 B2 | * | 9/2009 | Root | H04N 7/142 348/14.04 |
| 9,106,818 B2 | * | 8/2015 | Lai | H04N 5/2252 |
| 2008/0068493 A1 | * | 3/2008 | Hida | H04N 5/217 348/373 |
| 2010/0128122 A1 | * | 5/2010 | Wright | G03B 17/00 348/143 |
| 2014/0219647 A1 | * | 8/2014 | Lai | G03B 17/561 396/428 |
| 2017/0048457 A1 | * | 2/2017 | Eguchi | H04N 5/23203 |
| 2018/0149949 A1 | * | 5/2018 | Kim | F16M 11/06 |
| 2019/0051126 A1 | * | 2/2019 | Fukuzawa | H04N 5/2251 |
| 2019/0098189 A1 | * | 3/2019 | Kimura | G08B 13/1963 |

* cited by examiner

*Primary Examiner* — Kelly L Jerabek (57) ABSTRACT

An imaging module includes an imaging unit, a first bracket, a first shaft member and a first fixing member. The imaging unit includes a first circular hole. The first bracket includes a first non-circular hole. The first shaft member includes a first non-circular shaft portion. The first non-circular shaft portion is disposed in the first non-circular hole and the first circular hole, such that the first shaft member is disposed on the first bracket and the imaging unit is rotatably disposed on the first shaft member. The first fixing member is fixed on an end of the first shaft member.

16 Claims, 6 Drawing Sheets

IMAGING MODULE AND ELECTRONIC DEVICE

BACKGROUND OF THE INVENTION

1. Field of the Invention

The invention relates to an imaging module and, more particularly, to an imaging module having a rotatable imaging unit and an electronic device equipped with the imaging module.

2. Description of the Prior Art

As technology advances and develops, various electronic devices are considered a necessity by a lot of people in their daily lives. At present, some electronic devices (e.g. display device, television, etc.) are equipped with an imaging unit (e.g. projector, camera, etc.) to increase additional value for the electronic devices. However, the imaging unit of the prior art is fixed on a casing of the electronic device, such that a user cannot adjust an orientation of the imaging unit according to specific purposes. Therefore, it is inconvenient in use.

SUMMARY OF THE INVENTION

An objective of the invention is to provide an imaging module having a rotatable imaging unit and an electronic device equipped with the imaging module, so as to solve the aforesaid problems.

According to an embodiment of the invention, an imaging module comprises an imaging unit, a first bracket, a first shaft member and a first fixing member. The imaging unit comprises a first circular hole. The first bracket comprises a first non-circular hole. The first shaft member comprises a first non-circular shaft portion. The first non-circular shaft portion is disposed in the first non-circular hole and the first circular hole, such that the first shaft member is disposed on the first bracket and the imaging unit is rotatably disposed on the first shaft member. The first fixing member is fixed on an end of the first shaft member.

According to another embodiment of the invention, an electronic device comprises an electronic unit and an imaging module. The imaging module is disposed on the electronic unit. The imaging module comprises an imaging unit, a first bracket, a first shaft member and a first fixing member. The imaging unit comprises a first circular hole. The first bracket comprises a first non-circular hole. The first shaft member comprises a first non-circular shaft portion. The first non-circular shaft portion is disposed in the first non-circular hole and the first circular hole, such that the first shaft member is disposed on the first bracket and the imaging unit is rotatably disposed on the first shaft member. The first fixing member is fixed on an end of the first shaft member.

According to another embodiment of the invention, an imaging module comprises an imaging unit, a second bracket, a second shaft member and a second fixing member. The second bracket comprises a second circular hole. The imaging unit is disposed on the second shaft member. The second shaft member is disposed in the second circular hole, such that the second shaft member is rotatably disposed on the second bracket. The second fixing member is fixed on an end of the second shaft member.

According to another embodiment of the invention, an electronic device comprises an electronic unit and an imaging module. The imaging module is disposed on the electronic unit. The imaging module comprises an imaging unit, a second bracket, a second shaft member and a second fixing member. The second bracket comprises a second circular hole. The imaging unit is disposed on the second shaft member. The second shaft member is disposed in the second circular hole, such that the second shaft member is rotatably disposed on the second bracket. The second fixing member is fixed on an end of the second shaft member.

As mentioned in the above, the invention utilizes the first non-circular shaft portion of the first shaft member, the first non-circular hole of the first bracket, and the first circular hole of the imaging unit to cooperate with each other, such that the first shaft member is disposed on the first bracket and the imaging unit is rotatably disposed on the first shaft member. Furthermore, The invention may dispose the imaging unit on the second shaft member and rotatably dispose the second shaft member on the second bracket. Accordingly, a user can operate the imaging unit to rotate with respect to the first shaft member and/or operate the imaging unit to drive the second shaft member to rotate with respect to the second bracket, so as to adjust an orientation of the imaging unit according to specific purposes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
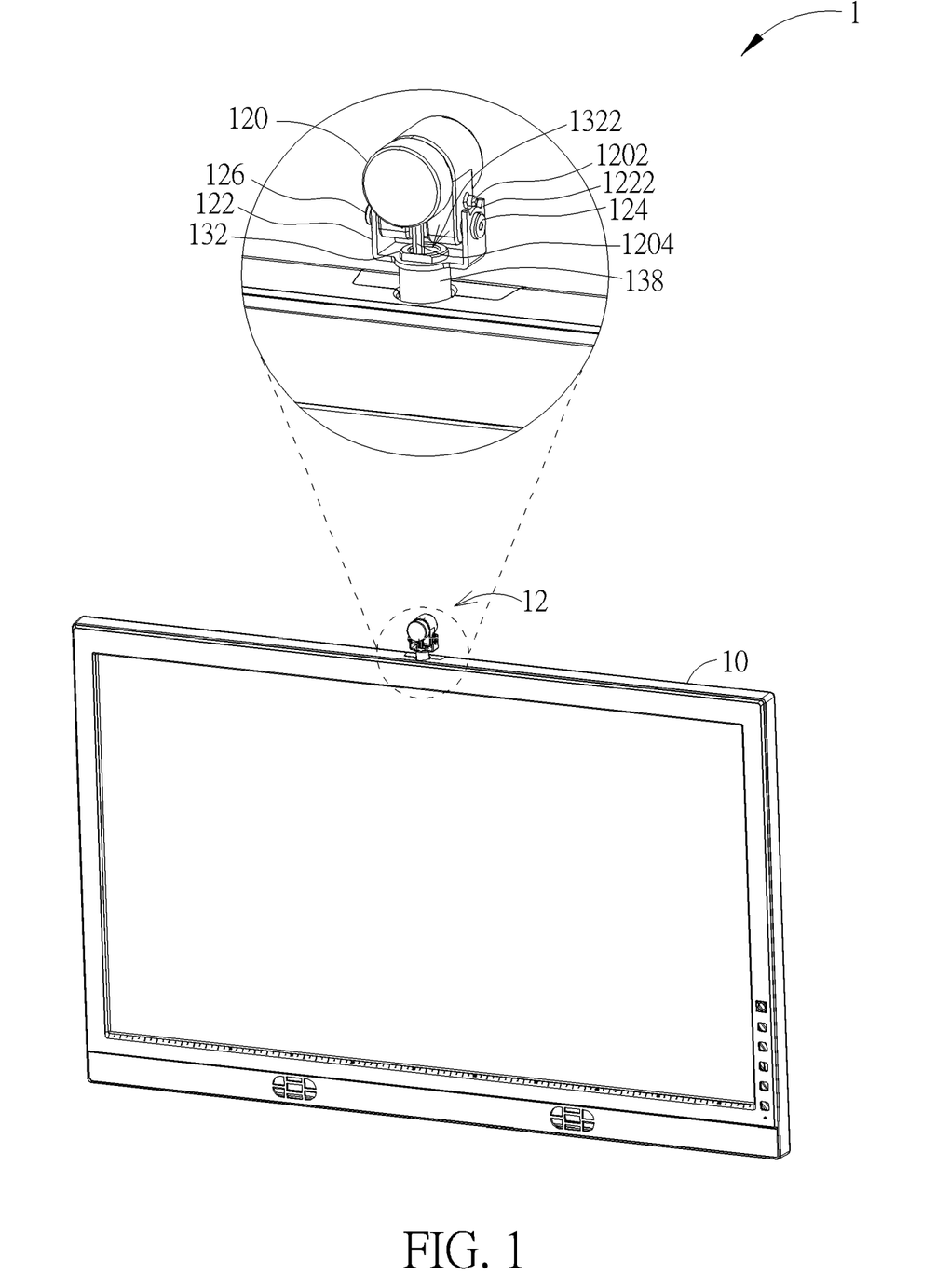
FIG. 1 is a perspective view illustrating an electronic device according to an embodiment of the invention.
Figure 2:
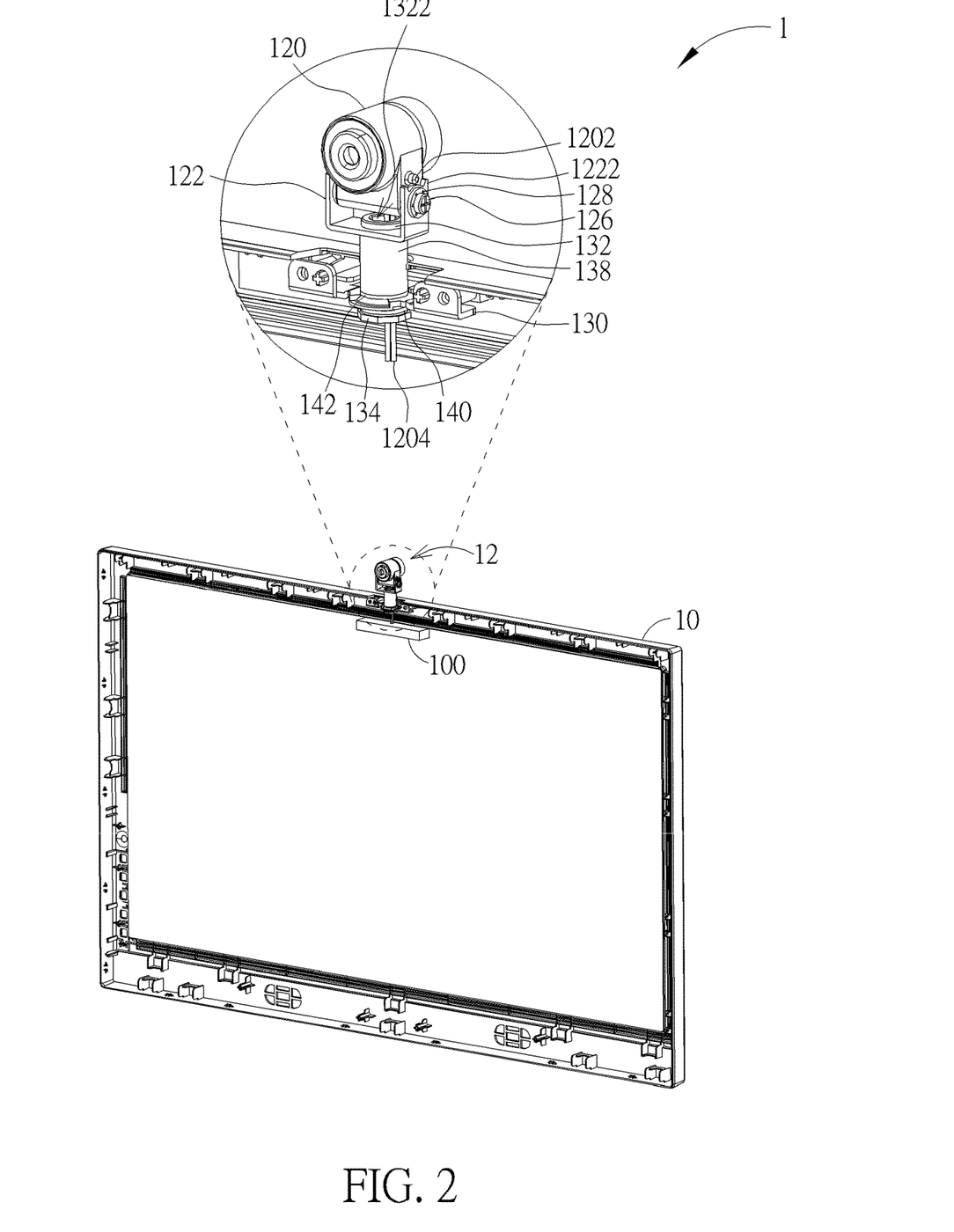
FIG. 2 is a perspective view illustrating the electronic device shown in FIG. 1 from another viewing angle.
Figure 3:
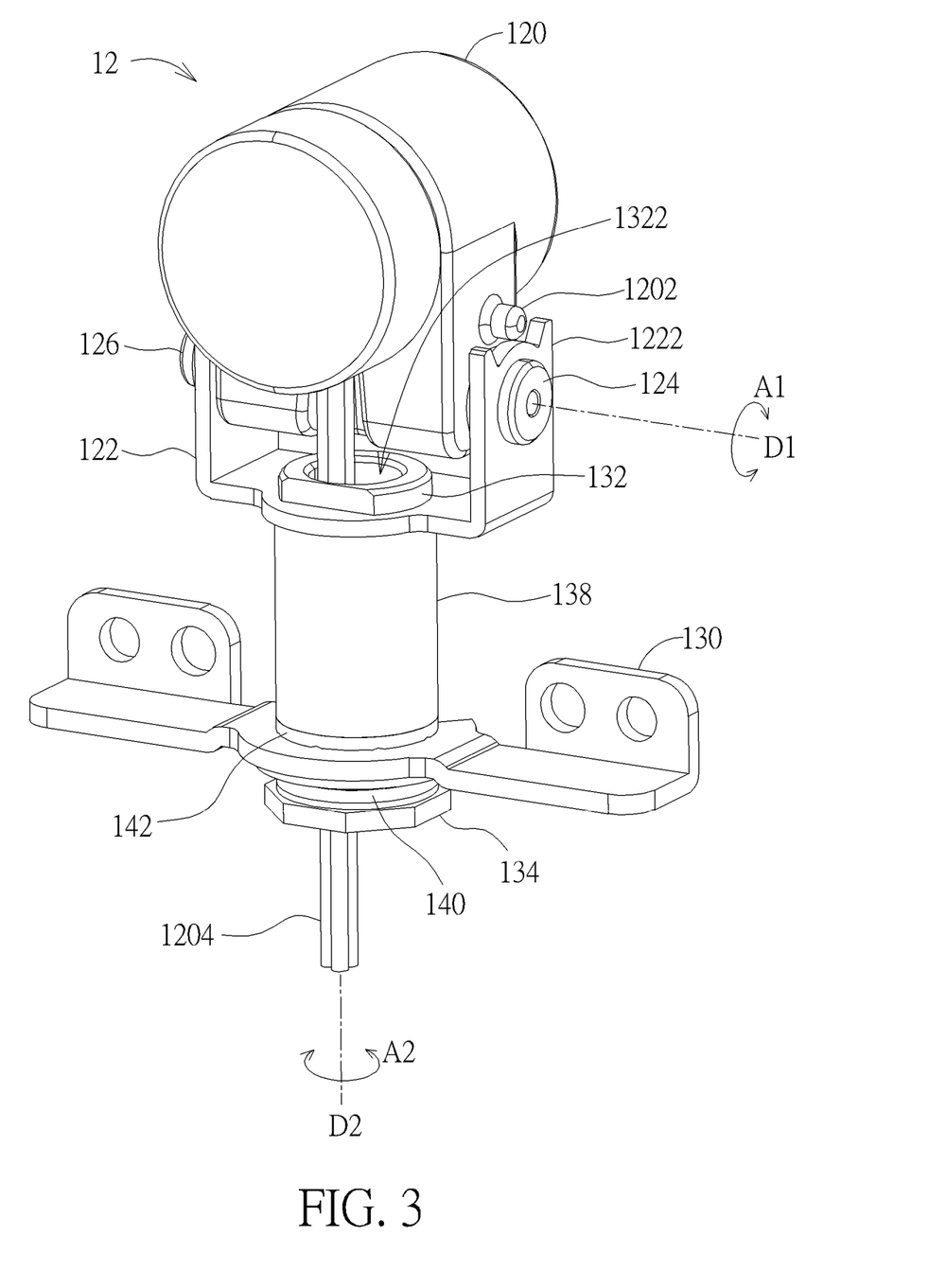
FIG. 3 is a perspective view illustrating the imaging module shown in FIG. 1.
Figure 4:
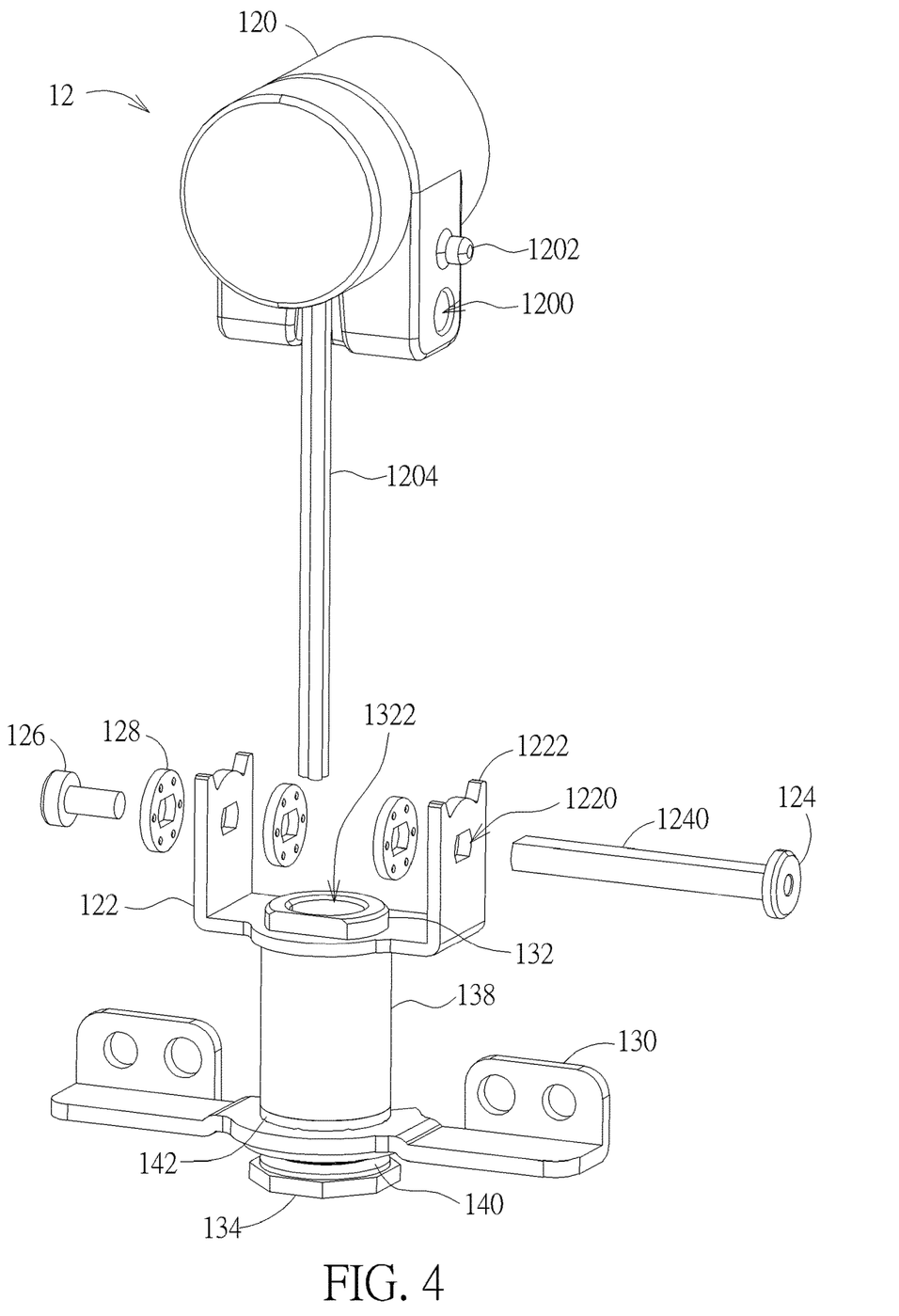
FIG. 4 is a partial exploded view illustrating the imaging module shown in FIG. 3.
Figure 5:
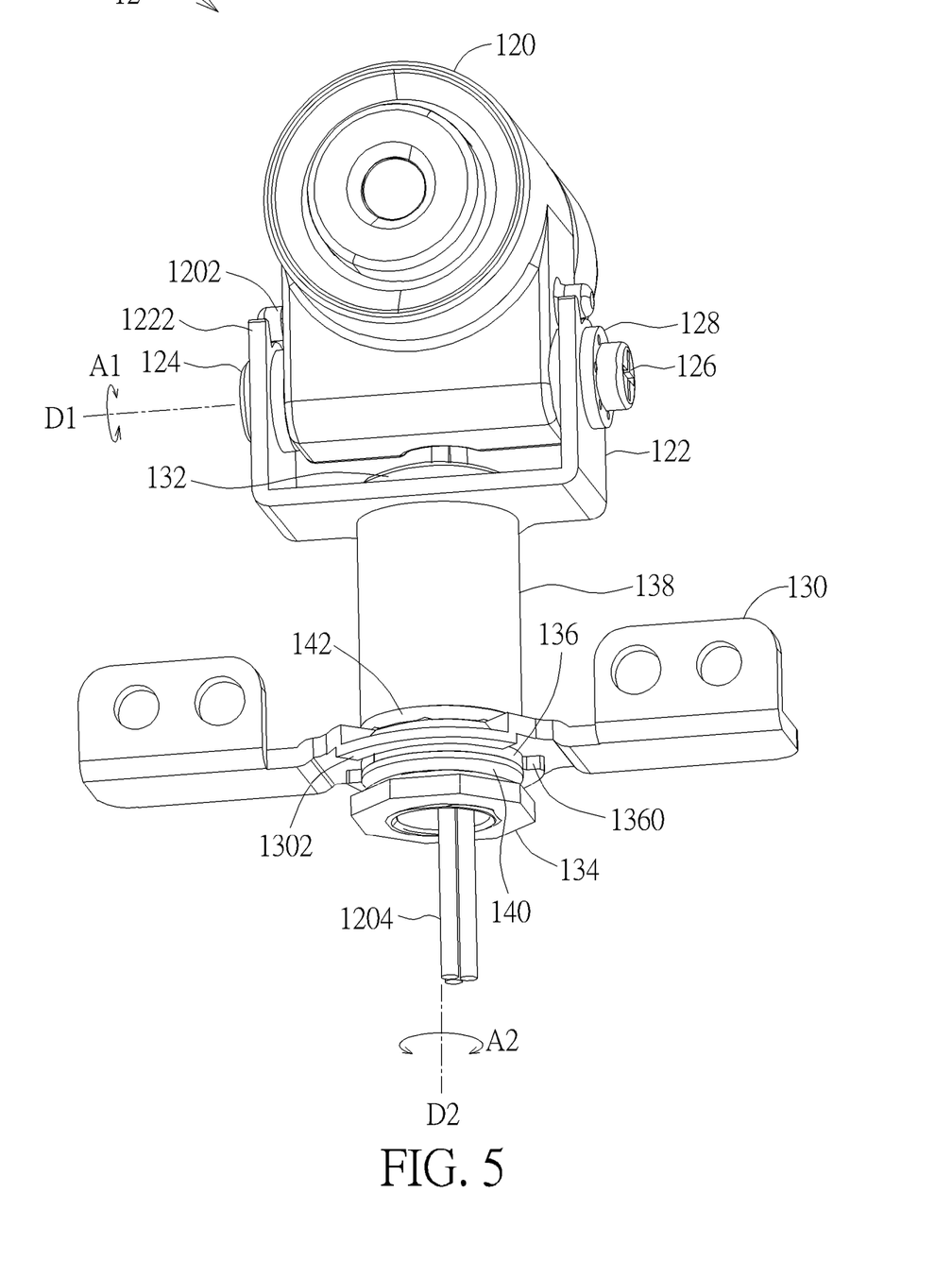
FIG. 5 is a perspective view illustrating the imaging module shown in FIG. 3 from another viewing angle.
Figure 6:
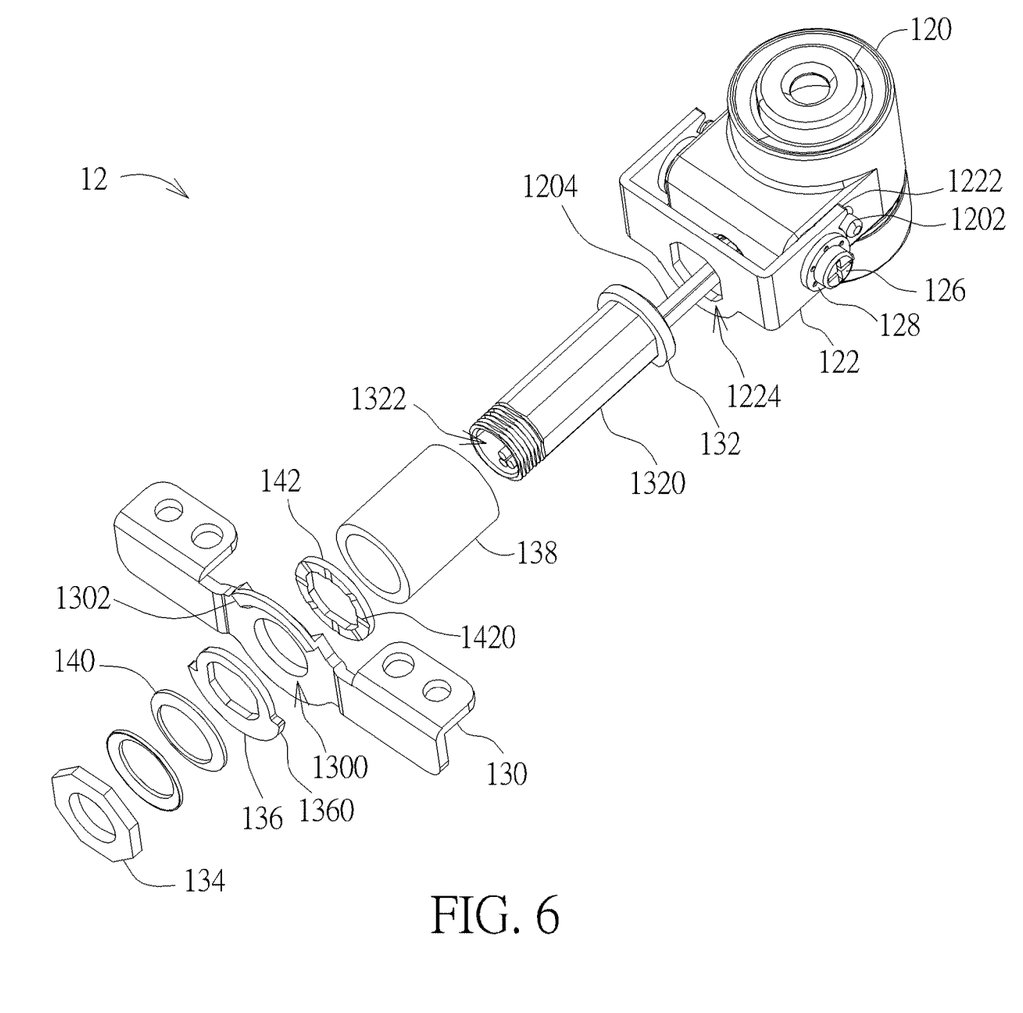
FIG. 6 is a partial exploded view illustrating the imaging module shown in FIG. 5.

Referring to FIGS. 1 to 6, FIG. 1 is a perspective view illustrating an electronic device 1 according to an embodiment of the invention, FIG. 2 is a perspective view illustrating the electronic device 1 shown in FIG. 1 from another viewing angle, FIG. 3 is a perspective view illustrating the imaging module 12 shown in FIG. 1, FIG. 4 is a partial exploded view illustrating the imaging module 12 shown in FIG. 3, FIG. 5 is a perspective view illustrating the imaging module 12 shown in FIG. 3 from another viewing angle, and FIG. 6 is a partial exploded view illustrating the imaging module 12 shown in FIG. 5.

As shown in FIGS. 1 and 2, the electronic device 1 comprises an electronic unit 10 and an imaging module 12, wherein the imaging module 12 is disposed on the electronic unit 10. In this embodiment, the electronic unit 10 may be a display device (e.g. liquid crystal display device, plasma display device, organic light emitting diode display device, etc.). In another embodiment, the electronic unit 10 may also be other electronic devices equipped with the imaging module 12 according to practical applications.

As shown in FIGS. 3 and 4, the imaging module 12 comprises an imaging unit 120, a first bracket 122, a first shaft member 124 and a first fixing member 126. In this embodiment, the imaging unit 120 may be a projector, a camera or other imaging devices according to practical applications. The imaging unit 120 comprises a first circular hole 1200, the first bracket 122 comprises a first non-circular hole 1220, and the first shaft member 124 comprises a first non-circular shaft portion 1240. The first non-circular shaft portion 1240 is disposed in the first non-circular hole 1220 and the first circular hole 1200, such that the first shaft member 124 is disposed on the first bracket 122 and the imaging unit 120 is rotatably disposed on the first shaft member 124. The first fixing member 126 is fixed on an end of the first shaft member 124, so as to fix the first shaft member 124 on the first bracket 122. In this embodiment, a shape of the first non-circular shaft portion 1240 corresponds to a shape of the first non-circular hole 1220, such that the first shaft member 124 cannot rotate with respect to the first bracket 122. Furthermore, the first bracket 122 may be U-shaped, such that each of opposite sides of the first bracket 122 comprises a first non-circular hole 1220. In practical applications, the first fixing member 126 may be a screw.

Accordingly, a user can operate the imaging unit 120 to rotate with respect to the first shaft member 124 in a direction indicated by a double-headed arrow A1, so as to adjust an orientation of the imaging unit 120 according to specific purposes. In this embodiment, the imaging module 12 may further comprise at least one first washer 128, wherein the first washer 128 is disposed on the first shaft member 124 and contacts the imaging unit 120 and the first bracket 122 tightly. The first washer 128 is used to provide friction, such that the imaging unit 120 can rotate with respect to the first shaft member 124 to a position desired by the user. It should be noted that the number of the first washers 128 may be one or more according to practical applications, so the invention is not limited to the embodiment shown in the figure.

In this embodiment, the imaging unit 120 may further comprise a first restraining portion 1202 and the first bracket 122 may further comprise a second restraining portion 1222. The first restraining portion 1202 cooperates with the second restraining portion 1222 to restrain a rotation angle of the imaging unit 120. In this embodiment, each of opposite sides of the imaging unit 120 comprises a first restraining portion 1202 and each of opposite sides of the first bracket 122 comprises a second restraining portion 1222.

As shown in FIGS. 5 and 6, the imaging module 12 may further comprise a second bracket 130, a second shaft member 132 and a second fixing member 134. The second bracket 130 comprises a second circular hole 1300 and the second shaft member 132 comprises a second non-circular shaft portion 1320. Furthermore, the first bracket 122 may further comprise a second non-circular hole 1224. The second non-circular shaft portion 1320 is disposed in the second non-circular hole 1224 and the second circular hole 1300, such that the second shaft member 132 is disposed on the first bracket 122 and the second shaft member 132 is rotatably disposed on the second bracket 130. The second fixing member 134 is fixed on an end of the second shaft member 132, so as to rotatably fix the second shaft member 132 on the second bracket 130. In practical applications, the second fixing member 134 may be a nut fixed on an outer thread of the end of the second shaft member 132. In this embodiment, a shape of the second non-circular shaft portion 1320 corresponds to a shape of the second non-circular hole 1224, such that the second shaft member 132 cannot rotate with respect to the first bracket 122.

Accordingly, the user can operate the imaging unit 120 to drive the second shaft member 132 to rotate with respect to the second bracket 130 in a direction indicated by a double-headed arrow A2, so as to adjust an orientation of the imaging unit 120 according to specific purposes. In this embodiment, an axial direction D1 of the first shaft member 124 may be perpendicular to an axial direction D2 of the second shaft member 132, such that the user can rotate the imaging unit 120 with respect to the electronic unit 10 vertically (i.e. the direction indicated by the double-headed arrow A1) and rotate the imaging unit 120 with respect to the electronic unit 10 horizontally (i.e. the direction indicated by the double-headed arrow A2).

It should be noted that, in another embodiment, the invention may utilize the first bracket 122, the first shaft member 124 and the first fixing member 126 to cooperate with each other individually, so as to allow the user to rotate the imaging unit 120 with respect to the electronic unit 10 vertically (i.e. the direction indicated by the double-headed arrow A1).

It should be noted that, in another embodiment, the invention may utilize the second bracket 130, the second shaft member 132 and the second fixing member 134 to cooperate with each other individually, so as to allow the user to rotate the imaging unit 120 with respect to the electronic unit 10 horizontally (i.e. the direction indicated by the double-headed arrow A2).

In this embodiment, the electronic unit 10 may comprise a circuit board 100, the imaging unit 120 may further comprise a cable 1204, and the second shaft member 132 may further comprise a through hole 1322. The cable 1204 can pass through the through hole 1322 and extend out of the second shaft member 132 to be connected to the circuit board 100 of the electronic unit 10. In this embodiment, the imaging module 12 may further comprise a restraining member 136 disposed on the second shaft member 132. The restraining member 136 may comprise a third restraining portion 1360 and the second bracket 130 may further comprise a fourth restraining portion 1302. When the second shaft member 132 rotates, the restraining member 136 rotates together with the second shaft member 132, such that the third restraining portion 1360 cooperates with the fourth restraining portion 1302 to restrain a rotation angle of the second shaft member 132. Accordingly, the cable 1204 will not be damaged due to over rotation of the imaging unit 120.

In this embodiment, the imaging module 12 may further comprise a sleeve 138, wherein the sleeve 138 is disposed on the second shaft member 132 and located between the first bracket 122 and the second bracket 130. As shown in FIG. 2, the second bracket 132 of the imaging module 12 may be fixed inside the electronic unit 10. Accordingly, the sleeve 138 is used to increase a distance between the first bracket 122 and the second bracket 130, such that the first bracket 122 and the imaging unit 120 thereon protrude from the electronic unit 10.

In this embodiment, the imaging module 12 may further comprise at least one second washer 140, wherein the second washer 140 is disposed on the second shaft member 132 and contacts the second fixing member 134 and the restraining member 136 tightly. The second washer 140 is used to provide friction, such that the second shaft member 132 can rotate with respect to the second bracket 130 to a position desired by the user. It should be noted that the number of the second washers 140 may be one or more according to practical applications, so the invention is not limited to the embodiment shown in the figure. Furthermore, the second washer 140 may be disposed on any position of the second shaft member 132, so the invention is not limited to the embodiment shown in the figure.

In this embodiment, the imaging module 12 may further comprise an oil storage washer 142 disposed on the second shaft member 132. The oil storage washer 142 has a plurality of oil storage grooves 1420 for storing a lubricating oil, so as to lubricate the second shaft member 132 and the components thereon.

As mentioned in the above, the invention utilizes the first non-circular shaft portion of the first shaft member, the first non-circular hole of the first bracket, and the first circular hole of the imaging unit to cooperate with each other, such that the first shaft member is disposed on the first bracket and the imaging unit is rotatably disposed on the first shaft member. Furthermore, The invention may dispose the imaging unit on the second shaft member and rotatably dispose the second shaft member on the second bracket. Accordingly, a user can operate the imaging unit to rotate with respect to the first shaft member and/or operate the imaging unit to drive the second shaft member to rotate with respect to the second bracket, so as to adjust an orientation of the imaging unit according to specific purposes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An imaging module comprising:
   an imaging unit comprising a first circular hole;
   a first bracket comprising a first non-circular hole;
   a first shaft member comprising a first non-circular shaft portion, the first non-circular shaft portion being disposed in the first non-circular hole and the first circular hole, such that the first shaft member is unrotatably disposed on the first bracket and the imaging unit is rotatably disposed on the first shaft member; and
   a first fixing member fixed on an end of the first shaft member.

2. The imaging module of claim 1, wherein the imaging unit further comprises a first restraining portion, the first bracket further comprises a second restraining portion, and the first restraining portion cooperates with the second restraining portion to restrain a rotation angle of the imaging unit.

3. The imaging module of claim 1, wherein the first bracket further comprises a second non-circular hole, the imaging module further comprises:
   a second bracket comprising a second circular hole;
   a second shaft member comprising a second non-circular shaft portion, the second non-circular shaft portion being disposed in the second non-circular hole and the second circular hole, such that the second shaft member is disposed on the first bracket and the second shaft member is rotatably disposed on the second bracket; and
   a second fixing member fixed on an end of the second shaft member.

4. The imaging module of claim 3, wherein an axial direction of the first shaft member is perpendicular to an axial direction of the second shaft member.

5. The imaging module of claim 3, further comprising a restraining member disposed on the second shaft member, the restraining member comprising a third restraining portion, the second bracket further comprising a fourth restraining portion, the third restraining portion cooperating with the fourth restraining portion to restrain a rotation angle of the second shaft member.

6. An electronic device comprising:
   an electronic unit; and
   an imaging module disposed on the electronic unit, the imaging module comprising:
      an imaging unit comprising a first circular hole;
      a first bracket comprising a first non-circular hole;
      a first shaft member comprising a first non-circular shaft portion, the first non-circular shaft portion being disposed in the first non-circular hole and the first circular hole, such that the first shaft member is unrotatably disposed on the first bracket and the imaging unit is rotatably disposed on the first shaft member; and
      a first fixing member fixed on an end of the first shaft member.

7. The electronic device of claim 6, wherein the imaging unit further comprises a first restraining portion, the first bracket further comprises a second restraining portion, and the first restraining portion cooperates with the second restraining portion to restrain a rotation angle of the imaging unit.

8. The electronic device of claim 6, wherein the first bracket further comprises a second non-circular hole, the imaging module further comprises:
   a second bracket comprising a second circular hole;
   a second shaft member comprising a second non-circular shaft portion, the second non-circular shaft portion being disposed in the second non-circular hole and the second circular hole, such that the second shaft member is disposed on the first bracket and the second shaft member is rotatably disposed on the second bracket; and
   a second fixing member fixed on an end of the second shaft member.

9. The electronic device of claim 8, wherein an axial direction of the first shaft member is perpendicular to an axial direction of the second shaft member.

10. The electronic device of claim 8, wherein the imaging module further comprises a restraining member disposed on the second shaft member, the restraining member comprises a third restraining portion, the second bracket further comprises a fourth restraining portion, and the third restraining portion cooperates with the fourth restraining portion to restrain a rotation angle of the second shaft member.

11. The electronic device of claim 8, wherein the electronic unit comprises a circuit board, the imaging module further comprises a cable, the second shaft member further comprises a through hole, and the cable passes through the through hole and extends out of the second shaft member to be connected to the circuit board.

12. The electronic device of claim 6, wherein the electronic unit is a display device and the imaging unit is a projector or a camera.

13. An imaging module comprising:
   an imaging unit comprising a first circular hole;
   a first bracket comprising a first non-circular hole and a second non-circular hole;
   a first shaft member comprising a first non-circular shaft portion, the first non-circular shaft portion being disposed in the first non-circular hole and the first circular hole, such that the first shaft member is disposed on the first bracket and the imaging unit is rotatably disposed on the first shaft member;

a first fixing member fixed on an end of the first shaft member;

a second bracket comprising a second circular hole;

a second shaft member comprising a second non-circular shaft portion, the second non-circular shaft portion being disposed in the second non-circular hole and the second circular hole, such that the second shaft member is disposed on the first bracket and the second shaft member is rotatably disposed on the second bracket; and a second fixing member fixed on an end of the second shaft member;

wherein the imaging unit further comprises a first restraining portion, the first bracket further comprises a second restraining portion, the second restraining portion comprises two stop portions opposite to each other, and the first restraining portion is located between the two stop portions to restrain a rotation angle of the imaging unit.

14. The imaging module of claim 13, further comprising a restraining member disposed on the second shaft member, the restraining member comprising a third restraining portion, the second bracket further comprising a fourth restraining portion, the third restraining portion cooperating with the fourth restraining portion to restrain a rotation angle of the second shaft member.

15. An electronic device comprising:
an electronic unit; and
an imaging module disposed on the electronic unit, the imaging module comprising:
an imaging unit comprising a first circular hole;
a first bracket comprising a first non-circular hole and a second non-circular hole;
a first shaft member comprising a first non-circular shaft portion, the first non-circular shaft portion being disposed in the first non-circular hole and the first circular hole, such that the first shaft member is disposed on the first bracket and the imaging unit is rotatably disposed on the first shaft member;

a first fixing member fixed on an end of the first shaft member;

a second bracket comprising a second circular hole;

a second shaft member comprising a second non-circular shaft portion, the second non-circular shaft portion being disposed in the second non-circular hole and the second circular hole, such that the second shaft member is disposed on the first bracket and the second shaft member is rotatably disposed on the second bracket; and a second fixing member fixed on an end of the second shaft member;

wherein the imaging unit further comprises a first restraining portion, the first bracket further comprises a second restraining portion, the second restraining portion comprises two stop portions opposite to each other, and the first restraining portion is located between the two stop portions to restrain a rotation angle of the imaging unit.

16. The electronic device of claim 15, wherein the imaging module further comprises a restraining member disposed on the second shaft member, the restraining member comprises a third restraining portion, the second bracket further comprises a fourth restraining portion, and the third restraining portion cooperates with the fourth restraining portion to restrain a rotation angle of the second shaft member.

* * * * *